United States Patent
Johnston

[15] 3,656,706
[45] Apr. 18, 1972

[54] PISTON FOLLOWER DEVICE

[72] Inventor: Everett E. Johnston, Newark, Tex.

[73] Assignee: Esco Elevators, Inc., Fort Worth, Tex.

[22] Filed: May 21, 1970

[21] Appl. No.: 39,460

[52] U.S. Cl. .................................................251/38, 91/49
[51] Int. Cl. ..............................................F16k 31/143
[58] Field of Search ........................................91/49; 251/38

[56] References Cited

UNITED STATES PATENTS

| | | | |
|---|---|---|---|
| 3,125,319 | 3/1964 | Arbogast | 91/49 X |
| 2,805,038 | 9/1957 | Towler et al. | 251/38 X |

Primary Examiner—Arnold Rosenthal
Attorney—Wofford and Felsman

[57] ABSTRACT

A piston follower device for control applications characterized by a control piston disposed in a control chamber and having a fluid passageway therethrough for communicating outside the control chamber; and a pilot piston disposed in a pilot chamber and having a regulator surface portion that is positionable adjacent the end of the fluid passageway that is in fluid communication with the control chamber to control the size of a fluid outlet. A port is provided in the pilot chamber for connecting the pilot pressure end with a first source of pressure for developing a force to position the pilot piston. A port is provided in the power end of the control chamber that, in co-action with the flow outlet, effects a control pressure for positioning the control piston and opposing the force on the pilot piston. A spring is disposed to act on the pilot piston, tending to force it in one direction or the other toward an equilibrium position. Also disclosed are specific applications in which the fluid ports are connected with sources of pressure for control applications; such as, positioning a valve portion with respect to a valve seat; and in which the equilibrium position effects s fully opened valve or a fully closed valve.

11 Claims, 3 Drawing Figures

INVENTOR
Everett E. Johnston
BY
Wofford & Felsman
ATTORNEYS

PISTON FOLLOWER DEVICE

BACKGROUND OF THE INVENTION

1. Field of the Invention

This invention relates to a control device and, more particularly, to a piston follower device for use in control applications.

2. Description of the Prior Art

The prior art is replete with a wide variety of control devices. Despite the wide and diverse varieties of control devices suggested, the prior art of which I am aware has not been satisfactory in providing a simple, ruggedly built piston follower control device that can be employed for simple on-off flow control or employed to replace sophisticated controls in difficultly resolvable control situations employing dynamic balancing of control elements.

DESCRIPTION OF THE PREFERRED EMBODIMENTS

Figure 1:
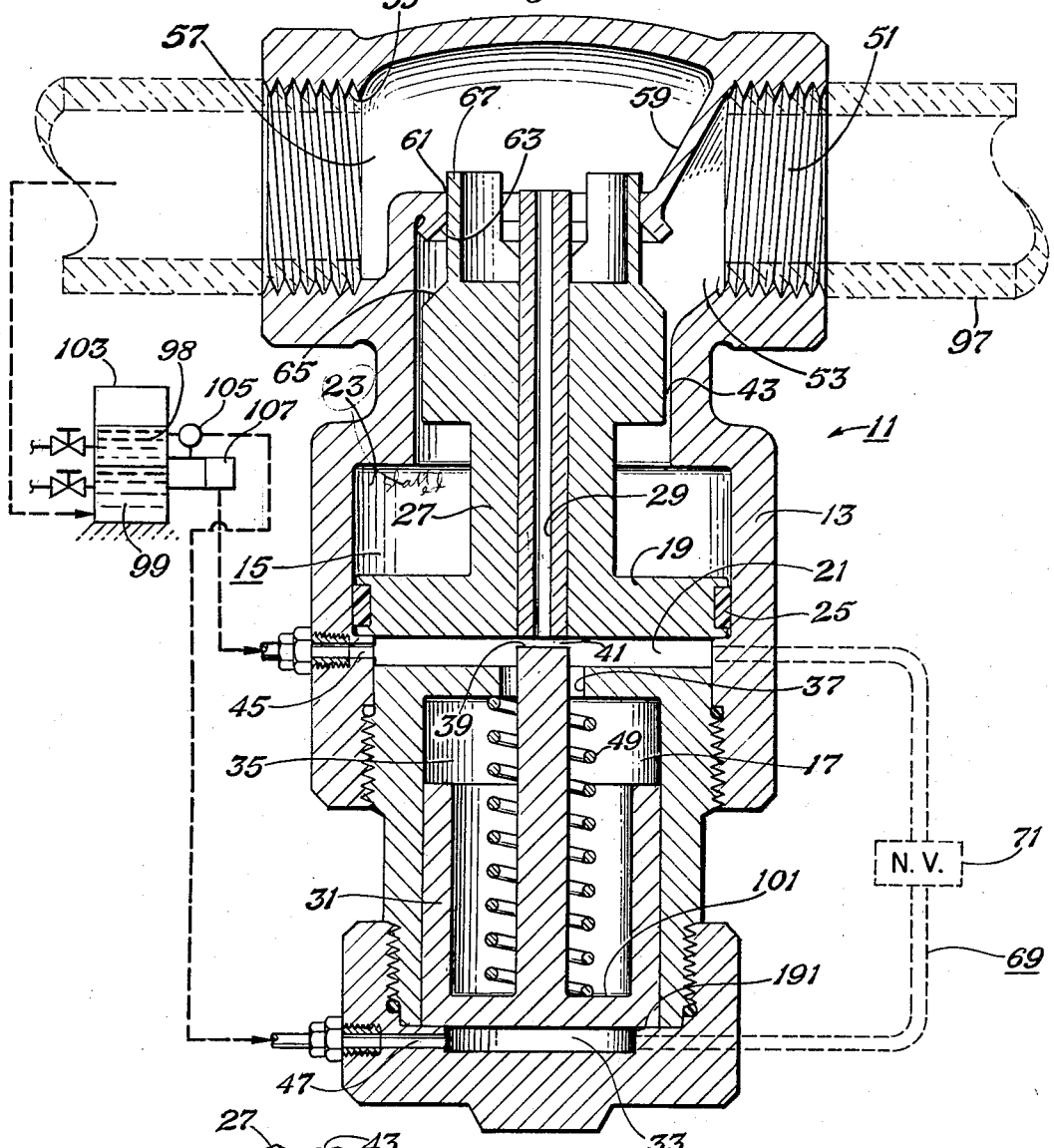
FIG. 1 is a cross sectional view, partly schematic, of one embodiment of this invention.

Referring to FIG. 1, piston follower device 11 includes a body 13 defining a control chamber 15 and a pilot chamber 17. A control piston 19 is disposed within control chamber 15 and divides the control chamber into power end 21 and shaft end 23. Control piston 19 has appropriate seal means 25 for preventing fluid communication between the power end 21 and the shaft end 23. Control piston 19 also has a shaft 27 for connecting with a control means. Control piston 19 has a larger surface exposed to fluid pressure in power end 21 than is exposed to fluid pressure in shaft end 23, since the shaft 27 reduces the area of the surface in shaft end 23. Control piston 19 also has a fluid passageway 29 therethrough. Fluid passageway 29 communicates at its one end with the power end of the control chamber and at its other end with a source of fluid at a different pressure; for example, with the downstream side of a valve means.

A pilot piston 31 is disposed within pilot chamber 17 and divides it into a pilot pressure end 33 and a control pressure end 35 that is in fluid communication via aperture 37 with the power end 21 of control chamber 15. Pilot piston 31 includes a regulator surface portion 39 that is positionable adjacent and near the one end of the fluid passageway that is in fluid communication with the power end of the control chamber. Regulator surface portion 39 and the adjacent one end of fluid passageway 29 define a flow restricting means such as outlet 41.

Annular passageway 43 intermediate shaft 27 and the wall of body 13 defines a first fluid communication means for connecting the shaft end 23 with a first source of fluid at a first pressure, referred to as first fluid pressure, to effect a pressure $P_i$ within the shaft end of the control chamber.

Port 45 serves as a second fluid communication means for connecting the power end 21 of the control chamber with a second fluid pressure. The second fluid communication means may also include appropriate bushings, fittings, and conduit such as tubing or passageways through the valve body; or other fluid flow means communicating between the power end 21 and the second fluid pressure.

A third fluid communication means comprising second port 47 is provided for connecting the pilot pressure end 33 with a third fluid pressure to effect a pilot pressure within the pilot pressure end of the pilot chamber. The third fluid communication means may also include appropriate bushings, fittings and conduit communicating between the pilot pressure end and the third fluid pressure source.

Figure 2:
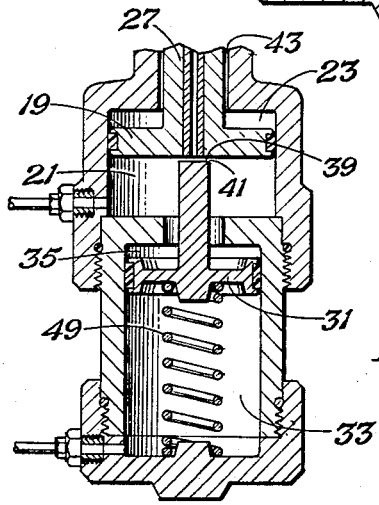
FIG. 2 is a partial cross sectional view of another embodiment of this invention with the biasing means reversed.

A biasing means comprising spring 49 is disposed to act on the pilot piston 31 so as to tend to force it toward an equilibrium position. As illustrated in FIG. 1, the equilibrium position tends to open outlet 41, reduce the control pressure in the power end 21 and effect movement of the control piston toward the control end, correspondingly positioning the control means. As illustrated in FIG. 2, however, the biasing means is reversed and tends to force the regulator surface portion 39 to close outlet 41. Closing outlet 41 raises the pressure in the power end 21 to the pressure with which port 45 is connected, and, if great enough, tends to force control piston 19 toward the shaft end.

As illustrated, the control means comprises a valve means for controlling fluid flow. Specifically, the piston follower device 11 includes an inlet passage 51 leading to an inlet chamber 53 and an outlet passage 55 leading from an outlet chamber 57. Interposed between the inlet and outlet chambers 53 and 57 is a wall structure 59 having an opening therein which serves as a valve aperture 61. Circumferentially disposed about valve aperture 61 on the inlet side is a valve seat 63. A poppet valve portion 65 has a guiding skirt 67 slidably retained within valve aperture 61 and having slots therein defining a fluid flow path. The poppet valve portion 65 may be at any position between a fully opened and a fully closed position. Depending upon the system in which it is employed, poppet valve portion 65 may effect a fully opened position for an equilibrium position or may effect a fully closed position for an equilibrium position. The biasing means and the respective pressures will be disposed so as to create forces tending to position the control piston and, consequently, the valve means in the respective equilibrium position; for example, tending to open the valve means as illustrated in FIG. 1, and tending to close the valve means as illustrated in FIG. 2.

If desired, a fluid flow passageway 69, dashed lines, FIG. 1, may be provided in fluid communication between the pilot pressure end 33 and the power end 21 for allowing fluid to flow therebetween. Fluid flow passageway 69 has interposed therein a flow restricting device such as needle valve 71 for controlling the rate at which fluid flows through fluid flow passageway 69. Fluid flow passageway 69 enables dynamic positioning of pilot piston 31 and through follower action control piston 19 at an intermediate position. Fluid flow passageway 69 also allows a smooth control transition to follow from an abrupt change of either the pilot pressure $P_p$ in pilot end 33 or the control pressure $P_c$ in power end 21.

Figure 3:
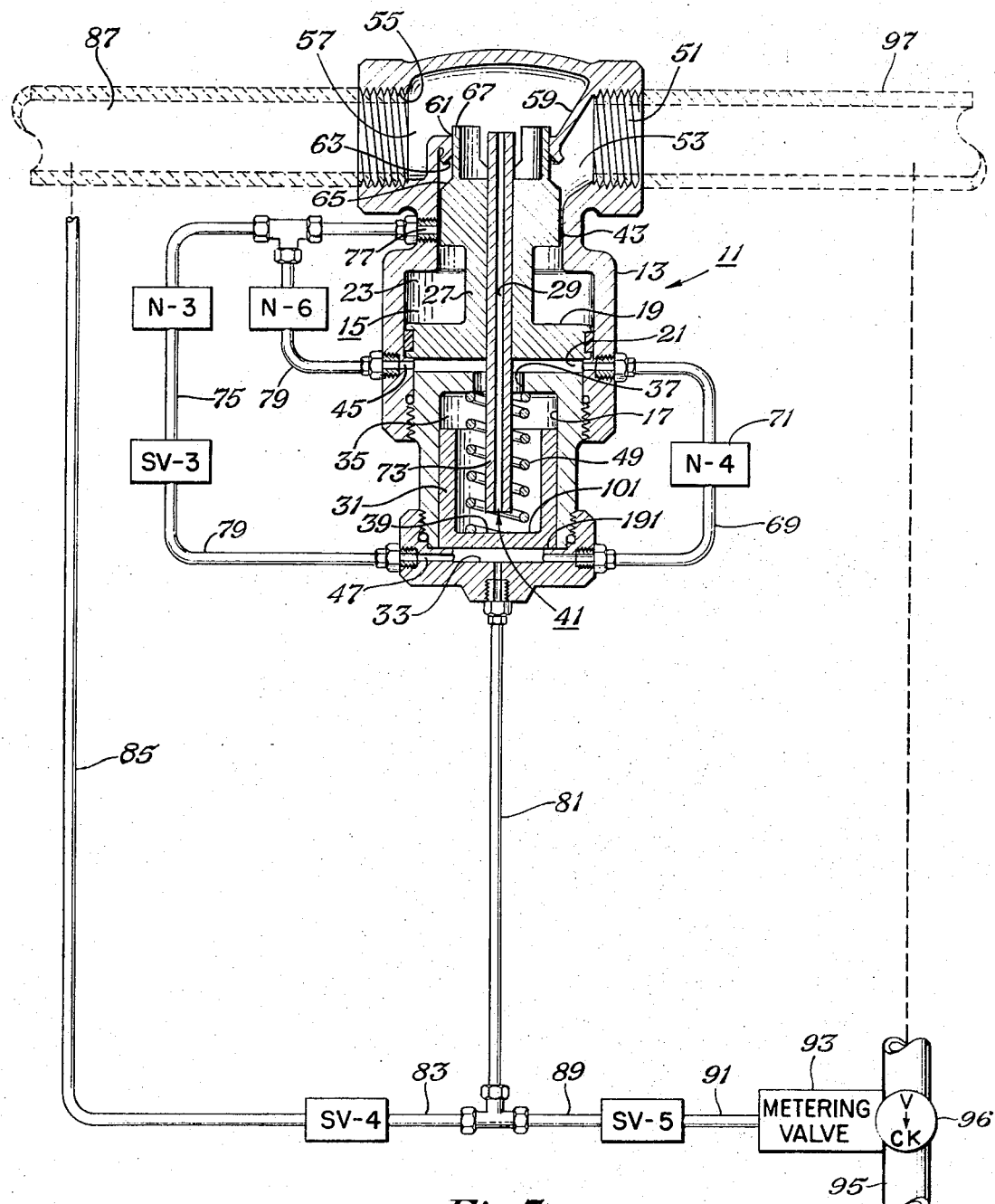
FIG. 3 is a schematic side cross sectional view of another embodiment of this invention.

Another embodiment of the invention is illustrated in FIG. 3. The embodiment illustrated in FIG. 3 may be employed in difficult control situations formerly requiring much more elaborate and sophisticated control equipment. It also illustrates the range of utility in which the piston follower device of the invention may be employed with only simple modifications. Ordinarily, the modifications may be made in external fluid communication means, although in FIG. 3 additional ports are shown for simplicity of explanation. As indicated, in FIG. 3 the basic constituents of the body, the chambers, and the respective pistons are much the same as illustrated and described in connection with FIG. 1. Accordingly, such description is not repeated herein, only the differences being noted. In FIG. 1, pilot piston 31 has a protruding regulator surface portion 39 that extends into the power end 21 of the control cylinder adjacent the one end of the fluid passageway 29, whereas in FIG. 3 fluid passageway 29 is extended via stem means 73 to near regulator surface 39 in the control pressure end 35 of pilot chamber 17 to define the outlet 41.

As illustrated in FIG. 3, the piston follower device may be employed as an up control bypass valve in a system described in detail in my copending application Ser. No. 885,736, entitled "Control System for Neutralizing Effect of Load Variations on Operation of a Hydraulic Elevator," filed Dec. 17, 1969. The detailed description of that elevator control system will not be repeated herein. The interconnection of the respective parts of the piston follower device will be described, however, with fluid flow being the same as is employed in an elevator control system for ensuring that a hydraulically powered elevator always stops level with a given floor, regardless of the load interposed thereon or the speed at which the elevator is moving.

Specifically, in FIG. 3, a schematic illustration of the interconnections of the elements in a working environment is shown. In addition to the elements previously described with respect to FIG. 1 and duplicated herein, a first fluid flow passageway 75 communicates between a first source of fluid pressure and the pilot pressure end of the pilot chamber for effecting a pilot pressure and generating a first force on the pilot piston for moving it in a first direction. The first fluid flow passageway 75 has first flow restricting means N-3 interposed therein and is serially connected with second port 47 and third port 77. As illustrated, third port 77 communicates with the fluid pressure in inlet chamber 53 which serves as a first source of fluid pressure. Any other source of fluid pressure which would effect the requisite pressure in power end 21 of control chamber 19 could be employed. The illustrated interconnection, however, eliminates the need for supplemental source of fluid pressure. A solenoid operated control valve SV-3 is also interposed in first fluid flow passageway 75 for controlling flow through first fluid passageway 75 in response to a first control signal such as an electrical signal from a control switch (not shown).

A second fluid passageway 79 communicates via a second flow restricting means N-6 between a second source of fluid pressure and the power end 21 of control chamber 15 for effecting a control pressure therein. The control pressure generates a second force on the pilot piston 31 for moving it in a second direction opposite to the first direction. It also generates a force on control piston 19 tending to force it upwardly, or tending to close the poppet valve portion 65 against valve seat 63. Specifically, second fluid passageway 79 has second flow restricting means N-6 interposed therein and is serially connected with port 45 and third port 77. As illustrated in FIG. 3, third port 77 is in fluid communication with inlet chamber 53 such that the second source of fluid pressure is the same as the first source of fluid pressure. A different source of fluid pressure can be employed, however, as long as it will effect the requisite force on the control piston and oppose the force on the pilot piston. Fluid flow passageway 69 communicates via a third flow restricting means N-4 between the pilot pressure end 33 and the power end 21 for effecting dynamic positioning of the pilot piston and for effecting a controlled response to a sudden change in one of the pressures in the cylinders; for example, the pilot pressure or the control pressure. Fluid flow passageway 69 is illustrated as being connected between an additional set of ports. If desired, however, it may be connected into first fluid flow passageway 75 and second fluid flow passageway 79 between any flow control or flow restricting means and respective ports 47 and 45. Fluid flow passageway 69, in the context of FIG. 3, may be thought of as a third fluid flow passageway.

A fourth fluid flow passageway 81 is provided communicating with another source of fluid at a fourth pressure and having a flow control means interposed therein for establishing a desired position of the pilot piston 31; and, through follower co-action, of the control piston 19. For wide flexibility in obtaining a desired control of fluid flow, fourth fluid flow passageway 81 is operationally connectable with either a low pressure source or a high pressure source of fluid. Expressed otherwise, fourth fluid flow passageway 81 is connected such that movement of pilot piston 31, and through follower action, movement of control piston 19 may be effected in either of two ways. First, in order that the pilot piston may be moved smoothly toward an equilibrium position; such as that effecting the fully opened position of the valve; by opening a flow control valve, passageway 81 is connected to a source of lower pressure. This arrangement is illustrated by serially connected line 83, solenoid valve SV-4, line 85, and return conduit 87 back to the fluid reservoir. Solenoid valve SV-4 is a controllable valve that can be actuated in response to an electrical signal from a suitable control switch (not shown).

Second, in order that pilot piston 31 and control piston 19 may be positioned at a plurality of dynamically controlled positions, correspondingly positioning poppet valve portion 65 at a plurality of positions for effecting variable fluid flow, passageway 81 is connected with a source of high or variable pressure. This arrangement is illustrated by serially connected line 89, solenoid valve SV-5, line 91, metering valve 93, check valve 96, and high pressure line 95 from the pump to the elevator jack. Line 95 supplies high pressure hydraulic fluid to raise an elevator. Metering valve 93 is connected into line 95 at check valve 96, and controls flow of fluid from line 95 into line 91 to keep some fluid moving through check valve 96 for up levelling, as described in U.S. Pat. No. 3,266,382, entitled "Hydraulic Elevator Control System," patented Aug. 16, 1966 to R. F. Loughridge. It is sufficient to say at this point that metering valve 93 bleeds the high pressure hydraulic fluid into pilot pressure end 33 to prevent complete opening of poppet valve 65 and ensure that a small amount of hydraulic fluid continues to flow through check valve 96 as will be apparent from the operational description hereinafter. Solenoid valve SV-5 is a controllable valve that is interposed in line 89 for controlling fluid flow therethrough in response to suitable signals such as a signal from a control switch (not shown).

In operation, piston follower device 11 has great flexibility in effecting the desired control in a wide variety of control situations. As illustrated in FIG. 1, for example, the piston follower device may be emplaced in a conduit to control fluid flow in response to different control variables. To illustrate, in a given liquid level control situation, it may be desirable to maintain both a differential head of a supernatant liquid 98, and a level of a heavier liquid 99; both of which are being flowed via a conduit 97 into a vessel 103 wherein the respective fluid levels are to be controlled. Fluid conduit 97 may be carrying the admixture of liquids to the vessel 103. The vessel, of course, would have the usual conduits and control valves for controlling the effluent flow of liquid from respective levels therein. With enough supernatant liquid in the vessel, the differential liquid level controller 105 might send a pilot pressure signal to second port 47 to drive regulator surface portion 39 against the end of fluid passageway 29 and cause the pressure in the power end 21 to be the same as being supplied by port 45. With sufficient control pressure, control piston 19 would close the valve means and stop further flow into the vessel. On the other hand, if there is inadequate heavier liquid in the vessel, the liquid level controller 107 therefor will not effect closure of the valve means. Specifically, the pressure at port 45 might be the pressure from the liquid level controller 107, which would be low. Accordingly, the control piston would not be moved toward the closed position until the control pressure in power end 21, the pressure from the liquid level controller 107, was great enough to produce a force greater than that produced by the pressure in shaft end 23 acting on the reduced area of the control piston 19. Thus, liquid would continue to flow into the vessel until the proper liquid level of the heavier liquid was also achieved. Thereafter, the pressure output from liquid level controller 107 and, hence, the control pressure would be great enough to force the control piston upwardly, closing the valve means.

Conversely, if the pressure from liquid level controller 107 were great enough to cause the control piston to close poppet valve portion 65 against seat 63, but there was inadequate supernatant liquid in the vessel, liquid should continue to flow into the vessel. Differential liquid level controller 105 would lower its output such that the pressure would be reduced in pilot pressure end 33. The pilot piston 31 would be moved toward pilot pressure end 33 by the control pressure in power end 21 and the force of biasing means 49, opening outlet 41, reducing the pressure in power end 21 and allowing poppet valve 65 to be opened by movement of the control piston toward the power end. As the differential head of liquid builds and the pressure in pilot pressure end 33 increases, the regulator surface portion 39 is moved to close off the outlet 41, allowing the control pressure in power end 21 to increase and effect closure of poppet valve portion 65 by the desired movement of control piston 19.

As can be seen from the operational sequence described above, a simple control is effected in response to a dual parameter control system. If desired, smoother control can be effected by the inclusion of the fluid flow passageway 69 with its adjustable flow restricting means such as needle valve 71 therein. That is, a sudden change in either the pilot pressure or the control pressure would not effect so drastic a change in movement of either pilot piston 31 or control piston 19 because the pressure would build up in either the power end or the piston end more gradually since fluid would be bled at a controlled rate into the opposing end. The bypass arrangement afforded by fluid flow passageway 69 in conjunction with the biasing means affects a fail-safe arrangement which will position the valve means at the desired equilibrium position in the event of a malfunction. In FIG. 1, for example, if the control pressure becomes as great as the pilot pressure, the valve means will open to keep liquid flowing into the vessel 103. This arrangement would be desirable where one of the liquids served as feed for another unit and a minimum level was vital to a large process.

As illustrated, the biasing means such as spring 49 co-acts with the pressure in power end 21 to tend to force pilot piston 31 toward pilot pressure end 33, thereby opening the valve means in the equilibrium position. There may be instances where the equilibrium position that is desired is with the valve closed. In such instances, the biasing means may be reversed as indicated in FIG. 2. As illustrated therein, the pilot piston 31 is biased to move toward and close outlet 41 in the power end such that the pressure in the power end would go to the maximum control pressure and would, consequently, tend to close poppet valve 65 against valve seat 63 in the equilibrium position. The embodiment chosen will depend on what position of the valve is desired in emergencies, commonly referred to as the "fail-safe" position. The fluid flow passageway 69 may be incorporated into the embodiment of FIG. 2, if desired, to allow the same smoother response to variations in the control pressure or pilot pressure and equilibrium positioning of the valve. Fluid flow passageway 69 may be employed in conjunction with a check valve in one control line to allow the other control parameter to ultimately effect closure of the valve by equalizing the pilot pressure and the control pressure.

In operation of the embodiment of FIG. 3, the piston follower device is employed as an up control bypass valve in a hydraulic elevator control system similar to that described in a plurality of patents; for example, U.S. Pat. No. 3,065,738; U.S. Pat. No. 3,141,383; and U.S. Pat. No. 3,266,382, issued to R. F. Loughridge and U.S. Pat. No. 3,438,398, issued to Everett E. Johnston; and specifically described in my aforementioned copending application Ser. No. 885,736. It is sufficient to note, that operation of the piston follower device of FIG. 3 controls the valve means through which hydraulic fluid is being bypassed from inlet conduit 97, connected in parallel with a hydraulic jack controlling movement of an elevator. The hydraulic fluid is bypassed into return conduit 87 for return to the reservoir when the elevator is not being raised. Thus, in the equilibrium position, poppet valve 65 is fully opened and all of the fluid is being returned to the reservoir while the fluid in the hydraulic jack controlling the elevator is held by check valve 96.

To start a cycle of movement upwardly, the up button switch or selected floor button switch in the elevator (not shown) is depressed. Solenoid valve SV-4 closes, which prevents the fluid from flowing through dump lines 83 and 85 to return conduit 87. Solenoid valve SV-5 also closes, preventing fluid flow through line 89. Solenoid valve SV-3 opens, allowing the fluid to flow through first fluid flow passageway 75 and flow restricting means N-3 into second port 47. Fluid also flows through second fluid flow passageway 79 and flow restricting means N-6 into port 45. There is a tendency for the pressure in pilot pressure end 33 and control pressure end 35 to balance by way of third fluid flow passageway 69 and needle valve N-4. More than offsetting this tendency to balance, however, is outlet 41 which allows fluid to flow from control pressure end and power end 21, through passageway 29 to outlet chamber 57, consequently lowering the control pressure. When the higher pressure in pilot pressure end 33 becomes great enough to overcome the force of spring 49, pilot piston 31 is moved upwardly in FIG. 3, moving pressure regulator portion 39 closer to the end of passageway 29, reducing the outlet 41. When outlet 41 is small enough and sufficiently reduces the escape of fluid from power end 21, the pressure increases and begins to force control piston 19 toward the closed position. Pilot piston 31 and control piston 19 move in piston-follower relationship because of the respective pressure forces as delineated hereinbefore. Movement of control piston 19, moves valve portion 65 toward valve seat 63, ultimately effecting a fully closed aperture and all of the fluid is being employed in the hydraulic jack to raise the elevator. Even when the valve means is fully closed, however, a small opening at outlet 41 will still allow a bleed-off of a small amount of fluid to balance the effects of spring 49. Thus, the pilot piston is retained in dynamic balance.

The elevator is thus moving upwardly at full speed. As it approaches a desired destination floor, a deceleration phase is initiated by a suitable cam actuating a suitable switch means (not shown). Actuation of the switch means closes solenoid valve SV-3 and opens solenoid valve SV-5. Closure of solenoid valve SV-3 prevents further fluid flow into pilot pressure end 33 and pressure tends to equalize by way of third fluid flow passageway 69 and needle valve N-4. Consequently, spring 49 moves pilot piston 31 downwardly, enlarging the outlet 41. The larger outlet 41 allows a greater volume of fluid to flow out fluid passageway 29, reducing the pressure in the power end 21 of control chamber 15 and acting on control piston 19. Thus, control piston 19 will move downwardly, or toward power end 21, opening the aperture effected between poppet valve portion 65 and seat 63. The rate of deceleration is controlled by adjusting needle valve N-4 in third fluid flow passageway 69.

The solenoid valve SV-5 and fourth fluid flow passageway 81 are employed to effect an up levelling phase in the elevator control cycle. They may be employed to control fluid flow responsive to almost any variable. When the switch means is actuated by the cam, solenoid valve SV-5 is opened, and fluid is supplied from check valve 96 via metering valve 93 and line 91 to pilot pressure end 33. This added pressure serves to retain pilot piston 31 at some intermediate position which retains some fluid flowing through the check valve to the hydraulic jack so that the elevator car continues to move upwardly with a constant up levelling speed as described in connection with the copending application Ser. No. 885,736 and in U.S. Pat. No. 3,266,382, referred to hereinbefore.

The elevator will continue to move upwardly at a constant up levelling speed until the desired destination floor is reached, at which time the solenoid valve SV-4 is opened, inter alia. The opening of solenoid valve SV-4 dumps fluid from the pilot pressure end 33, opens the bypass valve, and stops the elevator. The piston follower device is again ready for another cycle of upward movement if it is desired to proceed to another higher floor.

Thus, it can be seen that the piston follower device of the invention has application in a wide variety of situations. It is simple and ruggedly constructed and may be employed in difficultly accessible environments since it is trouble-free in operation.

Certain of the terms employed herein have been exemplified by narrow embodiments and a brief consideration of broader implications may be helpful. As illustrated, the pilot piston has equal areas subjected to the respective fluid pressures such that when the pressures on both sides thereof are equal the response of the pilot piston is governed by the spring constant, or a predictable response of the biasing means. Different areas may be employed if desired.

Although pilot and control pistons have been described herein, the term "piston," is employed in a generic sense to represent any body, including diaphram structures serving as thin pistons, that are subjected to and moved in response to fluid pressure and forces derived from system fluid pressure and modified as described hereinbefore. Also, "fluid flow passageway," and the like include equivalent structures.

Although the present invention has been described with a certain degree of particularity, it is understood that the present disclosure has been made only by way of example and that numerous changes in the details of construction and the combination and arrangement of parts may be resorted to without departing from the spirit and the scope of the invention.

What is claimed is:

1. A piston follower device comprising:
  a. a body having a control chamber therein;
  b. a control piston disposed within said control chamber and having a shaft for connecting with a control means; said control piston dividing said control chamber into a power end and a shaft end and having a larger surface exposed to fluid pressure in said power end that is exposed to fluid pressure in said shaft end; said control piston also having therethrough a fluid passageway for communicating at one end with said power end and at the other end with a source of fluid at a different pressure;
  c. a pilot chamber in fluid communication with said power end;
  d. a pilot piston disposed within said pilot chamber and dividing said pilot chamber into a pilot pressure end, and a control pressure end that is in fluid communication with said power end of said control chamber; said pilot piston including a regulator surface portion that is positionable adjacent and near said one end of said fluid passageway through said control piston to define a flow restricting means;
  e. first fluid communication means for connecting said shaft end with a first fluid pressure to effect a pressure $P_i$ therewithin;
  f. second fluid communication means for connecting said power end with a second fluid pressure tending to effect a control pressure therewithin;
  g. third fluid communication means for connecting said pilot pressure end with a third fluid pressure to effect a pilot pressure therewithin;
  h. fourth fluid communication means between said pilot pressure end and said power end having interposed therein a flow restricting device for effecting a dynamic balance on said pistons and for effecting a controlled response to a sudden change of one of the pressures, control pressure and pilot pressure; and
  i. biasing means disposed to act on said pilot piston and tending to force it to an equilibrium position; whereby when connected with the respective fluid pressures said pilot piston is positioned by forces, including pilot pressure, said biasing means and control pressure, with its regulator surface portion defining said flow restricting means with said one end of said fluid passageway; said flow restricting means being adapted to coact with said second fluid communication means to effect a control pressure in said power end and, consequently, in said control pressure end, and by follower action effect a corresponding position of said control piston.

2. A piston follower device comprising:
  a. a body having a control chamber therein;
  b. a control piston disposed within said control chamber and having a shaft for connecting with a valve means; said control piston dividing said control chamber into a power end and a shaft end and having a larger surface exposed to fluid pressure in said power end than is exposed to fluid pressure in said shaft end; said control piston also having therethrough a fluid passageway for communicating at one end with said power end and at the other end with a source of fluid at a pressure which is less than the fluid pressure on the upstream side of said valve means;
  c. a pilot chamber in fluid communication with said power end;
  d. a pilot piston disposed within said pilot chamber and dividing said pilot chamber into a pilot pressure end, and a regulator surface portion that is positionable adjacent and near said one end of said fluid passageway through said control piston to define a flow restricting means;
  e. first fluid communication means for connecting said shaft end with a first fluid pressure, which is the fluid pressure on the upstream side of said valve means, to effect a pressure $P_i$ therewithin;
  f. second fluid communication means for connecting said power end with a second fluid pressure tending to effect a control pressure therewithin;
  g. third fluid communication means for connecting said pilot pressure end with a third fluid pressure to effect a pilot pressure therewithin; and
  h. biasing means disposed to act on said pilot piston and tending to force it to an equilibrium position; whereby when connected with the respective fluid pressures said pilot piston is positioned by forces, including pilot pressure, said biasing means and control pressure, with its regulator surface portion defining said flow restricting means with said one end of said fluid passageway; said flow restricting means being adapted to coact with said second fluid communication means to effect a control pressure in said power end and, consequently, in said control pressure end, and by follower action effect a corresponding position of said control piston.

3. The piston follower device of claim 2 wherein said biasing means is disposed to act on said pilot piston so as to force it toward said pilot pressure end for increasing the flow of fluid through said fluid passageway for effecting movement of said control piston toward said power end.

4. The piston follower device of claim 2 wherein said biasing means is disposed to act on said pilot piston so as to force it toward said control pressure end for decreasing the flow of fluid through said fluid passageway for effecting movement of said control piston toward said shaft end.

5. A piston follower device comprising:
  a. a body having an inlet passage and an inlet chamber for connection with a high pressure source of fluid, and having an outlet passage and an outlet chamber for connection with a low pressure source of fluid;
  b. wall structure intermediate said inlet chamber and said outlet chamber and having an aperture communicating therebetween and having a valve seat therearound;
  c. valve portion disposed adjacent said valve seat, operable to control flow of fluid through said aperture by being moved with respect to said valve seat;
  d. control chamber in fluid communication with said inlet chamber;
  e. control piston disposed within said control chamber and connected via a shaft with said valve portion so as to position said valve portion with respect to said valve seat; said control piston dividing said control chamber into a power end, and a shaft end that is in fluid communication with said inlet chamber, and having a larger surface exposed to fluid pressure in said power end than is exposed to fluid pressure in said shaft end; said control piston also having therethrough a fluid passageway that communicates at one end with said outlet chamber;
  f. a pilot chamber in fluid communication with said power end;
  g. a pilot piston disposed within said pilot chamber; dividing said pilot chamber into a pilot pressure end and a control pressure end that is in fluid communication with said power end; said pilot piston including a regulator surface portion that is positionable adjacent and near said one end of said fluid passageway through said control piston to define a flow restricting means;
  h. first fluid flow passageway communicating via a first flow restricting means between a first source of fluid pressure and said pilot pressure end of said pilot chamber for effecting a pilot pressure and generating a first force on said pilot piston for moving it in a first direction;

i. second fluid passageway communicating via a second flow restricting means between a second source of fluid pressure and said power end of said control chamber for effecting a control pressure generating a force on said control piston and generating a second force on said pilot piston for moving it in a second direction opposite said first direction;

j. biasing means disposed to act on said pilot piston so as to effect an equilibrium position thereof; whereby said pilot piston is positioned in accordance with the forces generated by said first and second forces and said biasing means with its regulator surface portion defining said flow restricting means with said one end of said fluid passageway; said flow restricting means co-acting with said second flow restricting means to effect a control pressure in said power end and, consequently, said control pressure end, and by follower action effect a corresponding position of said control piston and said valve portion.

6. The piston follower device of claim 5 wherein a third fluid flow passageway is provided communicating via a third flow restricting means between said pilot pressure end and said power end for effecting dynamic positioning of said pilot piston and for effecting a controlled response to a sudden change in one of said pilot pressure and said control pressure.

7. The piston follower device of claim 5 wherein said first source of fluid pressure and said second source of fluid pressure are both in fluid communication with said inlet chamber; a third fluid flow passageway is provided communicating via a third flow restricting means between said pilot pressure end and said power end; and a fourth fluid flow passageway is provided communicating with another source of fluid at a different pressure and having a flow control means interposed therein for establishing a dynamic balance on said pilot piston and through follower co-action between said regulator surface portion of said pilot piston and said one end of said fluid passageway through said control piston establishing a dynamic balance on said control piston.

8. The flow control device of claim 5 wherein said control piston has a stem means defining said fluid passageway, said stem means extending the fluid passageway to near said regulator surface portion of said pilot piston in said control pressure end of said pilot chamber.

9. The piston follower device of claim 5 wherein said pilot piston has a protruding regulator surface portion that extends into said power end of said control cylinder adjacent said one end of said fluid passageway.

10. The piston follower device of claim 5 wherein said biasing means is disposed to act on said pilot piston so as to force it toward the pilot pressure end so as to tend to position said valve portion in the open position.

11. The piston follower device of claim 5 wherein said biasing means is disposed to act on said pilot piston so as to force it toward the control pressure end so as to tend to position the valve portion in the closed position.

* * * * *